United States Patent
Schmuck et al.

(10) Patent No.: US 7,280,188 B2
(45) Date of Patent: Oct. 9, 2007

(54) METHOD FOR THE REFLECTOMETRIC TESTING OF AN OPTICAL TRANSMISSION LINE, OPTICAL DEVICE AND OPTICAL TRANSMISSION AND RECEPTION DEVICE

(75) Inventors: Harald Schmuck, Schwieberdingen (DE); Heinz-Georg Krimmel, Korntal-Münchingen (DE)

(73) Assignee: Alcatel, Paris (FR)

( * ) Notice: Subject to any disclaimer, the term of this patent is extended or adjusted under 35 U.S.C. 154(b) by 80 days.

(21) Appl. No.: 11/192,356

(22) Filed: Jul. 29, 2005

(65) Prior Publication Data

US 2006/0050265 A1    Mar. 9, 2006

(30) Foreign Application Priority Data

Sep. 3, 2004    (EP) .................................. 04292136

(51) Int. Cl.
*G01N 21/00* (2006.01)
(52) U.S. Cl. ..................................... 356/73.1
(58) Field of Classification Search ............... None
See application file for complete search history.

(56) References Cited

U.S. PATENT DOCUMENTS 4,070,118 A    1/1978    Maslowski et al.
4,243,320 A    1/1981    Gordon
2003/0113118 A1*    6/2003    Bartur ........................ 398/139

FOREIGN PATENT DOCUMENTS

| EP | 0 138 623 A | 4/1985 |
| EP | 0 405 553 A | 1/1991 |
| GB | 2 011 751 A | 7/1979 |
| WO | WO86/00134 A | 1/1986 |

OTHER PUBLICATIONS

Patent Abstracts of Japan Bd. 006 Br, 030 (P-103), Feb. 23, 1982 corresponding to JP 56 151336 A (Nippon Telegr &Teleph corp (NTT)), Nov. 24, 1981.

* cited by examiner

*Primary Examiner*—Tu T. Nguyen
(74) *Attorney, Agent, or Firm*—Sughrue Mion, PLLC

(57) ABSTRACT

The invention relates to a method for the reflectometric testing of an optical transmission line from an optical transmission and reception device, in which a test signal is fed into the transmission line from the direction of the optical transmission and reception device and the signal reflected back to the optical transmission and reception device is analysed, in which the transmission device provided for transmitting the useful signal is also used as the transmitter of the test signal by switching it from transmission mode to test mode, and the transmission device itself is used as the receiver of the reflected signal, as well as to an optical device and to an optical transmission and reception device therefore.

4 Claims, 1 Drawing Sheet

METHOD FOR THE REFLECTOMETRIC TESTING OF AN OPTICAL TRANSMISSION LINE, OPTICAL DEVICE AND OPTICAL TRANSMISSION AND RECEPTION DEVICE

BACKGROUND OF THE INVENTION

The invention is based on a priority application EP 04292136.1 which is hereby incorporated by reference.

The invention relates to a method for the reflectometric testing of an optical transmission line, in which a test signal is fed into the transmission line from the direction of an optical transmission device and the reflected signal is analysed. The invention further relates to an optical device for the reflectometric testing of an optical transmission line, having transmission means for feeding a test signal into the transmission line from the direction of the optical device, and having reception means for analysing the signal reflected back to the optical transmission and reception device. The invention further relates to an optical transmission and reception device.

Glass fibres are nowadays being used more and more in so-called metro networks and in access networks. In this context, there is an increasing need for continuous or at least regular monitoring of these optical data connections. The monitoring facilitates preventive measures when a data connection is gradually deteriorating, if this is detected early. High availability of the network is thereby ensured. This is important, for example, for the provision of critical services to business customers. In the event of failures as well, a monitoring device makes it possible to locate the error rapidly and determine the cause of error, in order to allow repair or rectification.

The network operator needs to be able to rapidly find the cause of a connection problem, for example in order to be able to distinguish between trouble with the glass fibre network and trouble at a network node, and, in the event of a glass fibre problem, to be able identify the error location and the type of error or a deterioration occurring along the entire connection.

It is known to use so-called OTDR measuring equipment (OTDR=Optical Time Domain Reflectometry) in order to monitor the quality of optical connections, for instance to identify cable breaks, to find errors, to recognise falling signal levels or the deterioration of properties. Measurements can thereby be carried out as required, for instance in order to document a glass fibre network, or with a special measuring wavelength in multiplex operation in parallel with the working network.

The costs of such measuring equipment are high, because they need to be very reliable and also flexible in order to satisfy all the requirements during operation in a very wide variety of network configurations.

The invention offers assistance for this by a method for the reflectometric testing of an optical transmission line, in which a test signal is fed into the transmission line from the direction of an optical transmission device and the reflected signal is analysed, wherein the transmission device provided for transmitting the useful signal is also used as the transmitter of the test signal by switching it from transmission mode to test mode, and in that the transmission device itself is used as the receiver of the reflected signal.

The invention further relates to an optical device for the reflectometric testing of an optical transmission line, having transmission means for feeding a test signal into the transmission line from the direction of the optical device, and having reception means for analysing the signal reflected back to the optical transmission and reception device, wherein the transmission means is the transmission device provided for transmitting the useful signal, and in that the reception means is the transmission device itself.

The invention further relates to an optical transmission and reception device, that contains an optical device for the reflectometric testing of an optical transmission line, that has transmission means for feeding a test signal into the transmission line from the direction of the optical device, and that has reception means for analysing the signal reflected back to the optical transmission and reception device, wherein the transmission means is the transmission device provided for transmitting the useful signal, and wherein the reception means is the transmission device itself.

The fact that the devices already provided for normal operation are substantially also used for the monitoring device provides very cost-effective monitoring.

Further refinements of the invention can be found in the dependent claims and the following description.

BRIEF DESCRIPTION OF THE DRAWINGS

The invention will be explained in more detail below with reference to the appended drawings.

DETAILED DESCRIPTION OF THE DRAWINGS

A first exemplary embodiment of an optical transmission and reception device according to the invention, having an optical device according to the invention, will firstly be described with reference to FIG. 1.

Figure 1:
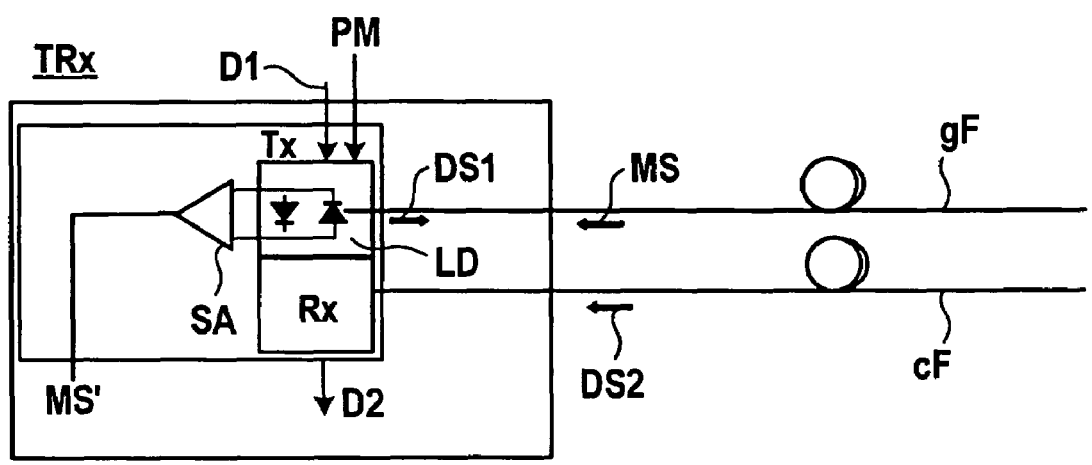
FIG. 1 shows a first exemplary embodiment of an optical transmission and reception device according to the invention, having an optical device according to the invention for carrying out the method according to the invention.

FIG. 1 shows an optical transmission and reception device TRx having an optical glass fibre gF (going fibre) leading from it and an optical glass fibre cF (coming fibre) arriving at it. The core of the optical transmission and reception device TRx is an optical transmitter Tx and an optical receiver Rx. A signal amplifier SA is also shown.

The optical transmitter Tx is represented in somewhat more detail, as is necessary for understanding the present invention. A laser diode LD is driven by a data stream D1 and transmits an optical data signal DS1 on the optical glass fibre gF leading from it. The laser diode is provided with a monitor diode, which does not fulfil a role essential to the invention in this first embodiment and is therefore not indicated. It is used to monitor the laser diode during regular operation.

An optical data signal DS2 arriving via the coming optical glass fibre cF is converted back into a data stream D2 in a receiver Rx. The individual measures which are necessary for this are unaffected by the present invention and will not be described in detail here.

In order to measure the properties of the optical glass fibre gF, the data stream D1 is interrupted or a suitable pause is waited for, and a pulse measurement signal PM is applied to the optical transmitter Tx and transmitted by the laser diode LD. Its components reflected at various places in the optical glass fibre gF return as a monitoring signal MS.

This exemplary embodiment utilises the fact that the electro-optical converters conventionally used nowadays, that is to say the laser diode as mentioned here, are also capable of an inverse operation in which the arriving light causes a change in the electrical properties, which can be read out at the terminals. If this change is not proportional to the intensity of the incoming light, then this must be taken into account in the subsequent evaluation circuit. Otherwise, the evaluation can be carried out in the known fashion, for which purpose this change is registered and converted by means of the signal amplifier SA into a measurement signal MS' proportional to the monitoring signal MS. The coupling of the signal amplifier SA to the light-emitting element, in this case the laser diode LD, should be understood very symbolically here; since it is generally the current through such an element rather than the voltage across it which is proportional to the arriving photon current, the registering is preferentially carried out with an ohmic impedance connected in series with the light-emitting element.

In any event, with an optical transmitter otherwise not constructed according to the invention, the measurement signal required for reflectometric monitoring may also be obtained here by very few extra elements.

The evaluation of the individual measurement signals is not affected by the present invention, and is not further described here.

A second exemplary embodiment will be described with reference to FIG. 2.

Figure 2:
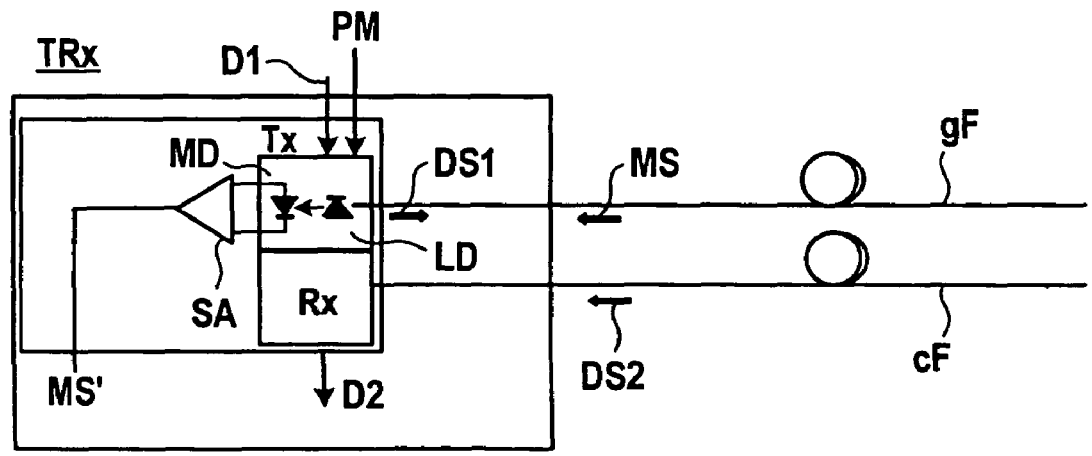
FIG. 2 shows a second exemplary embodiment of an optical transmission and reception device according to the invention, having an optical device according to the invention for carrying out the method according to the invention. The representation of a third exemplary embodiment is no different from this.

FIG. 2 differs only slightly from FIG. 1. Here, the monitor diode MD is explicitly indicated; the measurement signal MS' is in this case registered at the monitor diode. The comments made about registering the signal in the first exemplary embodiment also apply here. In this case, a separate signal amplifier may even be obviated since the monitor diode must in any event be equipped with one.

The second exemplary embodiment has the advantage over the first exemplary embodiment that the monitor diode is a component which is already optimised for conversion from the optical domain to the electrical domain, and that is not being operated in an operating mode other than that for which it is intended. However, the light levels of the laser diode itself and that of the reflected measurement signal MS are very different, so that this is not optimised. Added to this, the monitor diode does not lie directly in the light path of the incoming measurement signal, so that it can be determined there only after passing through the laser diode or being reflected by it.

The latter disadvantage is preferably overcome in a third exemplary embodiment by connecting the laser diode such that it acts as an optical amplifier for the incoming measurement signal, so that the light striking the monitor diode is already amplified.

The first and third exemplary embodiments are based on the fact that the laser diode being employed can also be used otherwise than just as a transmission diode, according to the type of interconnection. This is known per se; the appropriate wiring variants are also known per se.

The invention claimed is:

1. A method for the reflectometric testing of an optical transmission line, the method comprising: transmitting a test signal via the transmission line from an optical transmitter of an optical device; and receiving and analysing at the optical transmitter of the optical device a reflected test signal which is reflected back to the optical device via the transmission line, wherein the optical transmitter transmits a useful signal when switched to a transmission mode and transmits the test signal when switched to a test mode, and the optical transmitter of the optical device comprises a laser diode which transmits the test signal and the useful signal, and the laser diode comprises a monitor diode which receives the reflected test signal.

2. The method according to claim 1, wherein the laser diode is used as an optical amplifier.

3. An optical device for the reflectometric testing of an optical transmission line, the optical device comprising an optical transmitter which transmits a test signal and a useful signal via the optical transmission line, and receives and analyses a reflected test signal which is reflected back to the optical device via the optical transmission line, wherein the optical transmitter comprises a laser diode which transmits the test signal and the useful signal, and the laser diode comprises a monitor diode which receives the reflected test signal.

4. An optical transmission and reception device that comprises an optical device for the reflectometric testing of an optical transmission line, the optical device comprising an optical transmitter which transmits a test signal and a useful signal via the optical transmission line, and receives and analyses a reflected test signal which is reflected back to the optical device via the optical transmission line, wherein the optical transmitter comprises a laser diode which transmits the test signal and the useful signal, and the laser diode comprises a monitor diode which receives the reflected test signal.

\* \* \* \* \*